(12) United States Patent
Grammer et al.

(10) Patent No.: US 8,491,950 B2
(45) Date of Patent: Jul. 23, 2013

(54) CAT TREAT

(75) Inventors: Tracy Grammer, Long Beach, CA (US); Davor Juravic, San Pedro, CA (US); William Keehn, Perry, KS (US); Steven Bautista, Long Beach, CA (US); Eric J. Lew, Los Angeles, CA (US)

(73) Assignee: Del Monte Corporation, San Francisco, CA (US)

( * ) Notice: Subject to any disclaimer, the term of this patent is extended or adjusted under 35 U.S.C. 154(b) by 690 days.

(21) Appl. No.: 11/587,821

(22) PCT Filed: Apr. 28, 2005

(86) PCT No.: PCT/US2005/014610
§ 371 (c)(1),
(2), (4) Date: Nov. 27, 2007

(87) PCT Pub. No.: WO2005/110115
PCT Pub. Date: Nov. 24, 2005

(65) Prior Publication Data
US 2008/0175962 A1    Jul. 24, 2008

Related U.S. Application Data

(60) Provisional application No. 60/566,181, filed on Apr. 29, 2004, provisional application No. 60/599,058, filed on Aug. 6, 2004.

(51) Int. Cl.
*B65D 85/78* (2006.01)
(52) U.S. Cl.
USPC ........... 426/134; 426/132; 426/805; 119/710; 119/709; 119/51.03

(58) Field of Classification Search
USPC ............ 426/132, 134, 115, 805, 90–91, 660, 426/103–104; 119/51.03, 702, 707–711, 119/61.54–61.55
See application file for complete search history.

(56) References Cited

U.S. PATENT DOCUMENTS

| | | | | |
|---|---|---|---|---|
| 2,036,706 A | * | 4/1936 | Law | 426/85 |
| 2,317,067 A | * | 4/1943 | Knaust | 229/117.12 |
| 2,469,589 A | | 5/1949 | Barricini | |
| 3,974,296 A | * | 8/1976 | Burkwall | 426/104 |
| 4,218,482 A | * | 8/1980 | Cook et al. | 426/72 |
| 4,892,748 A | * | 1/1990 | Andersen et al. | 426/635 |
| 4,902,519 A | * | 2/1990 | Ream et al. | 426/91 |
| D359,607 S | * | 6/1995 | Yun | D1/106 |
| 5,773,058 A | | 6/1998 | Jones | |
| 5,773,070 A | * | 6/1998 | Kazemzadeh | 426/573 |

(Continued)

FOREIGN PATENT DOCUMENTS

WO    WO 0053031    *  9/2000

*Primary Examiner* — Drew Becker
*Assistant Examiner* — Luana Z Long
(74) *Attorney, Agent, or Firm* — Buchanan Ingersoll & Rooney PC

(57) ABSTRACT

A pet treat having a sugar-based edible portion including a palatant material and a support portion. Incorporation of starch provides a hard-candy texture for the edible portion. The pet treat may be formed as a lollipop, a toy, or a lozenge using either a batch process or a continuous process. Features to interest a pet include a resilient mount, or a rotatable mount. An adhesive mount can attach the support to a variety of surfaces. A replaceable cover and rejuvenant container may be used.

9 Claims, 25 Drawing Sheets

U.S. PATENT DOCUMENTS

| | | | |
|---|---|---|---|
| 5,947,061 A * | 9/1999 | Markham et al. | 119/710 |
| 5,989,604 A | 11/1999 | Wolf et al. | |
| 6,054,159 A * | 4/2000 | Manzone | 426/134 |
| 6,073,588 A * | 6/2000 | McClung et al. | 119/709 |
| 6,159,508 A | 12/2000 | Wolf et al. | |
| 6,187,350 B1 * | 2/2001 | Gallart et al. | 426/91 |
| 6,228,402 B1 | 5/2001 | Wolf et al. | |
| 6,440,449 B1 | 8/2002 | Hirschberg | |
| 6,506,401 B1 | 1/2003 | Rothamel et al. | |
| 6,634,318 B1 * | 10/2003 | Rucker | 119/709 |
| 2003/0118699 A1 | 6/2003 | Nicosia | |
| 2003/0228397 A1 * | 12/2003 | O'Donnell Kiely | 426/91 |
| 2004/0028783 A1 | 2/2004 | Fullwood et al. | |
| 2005/0069609 A1 * | 3/2005 | Straus et al. | 426/103 |

\* cited by examiner

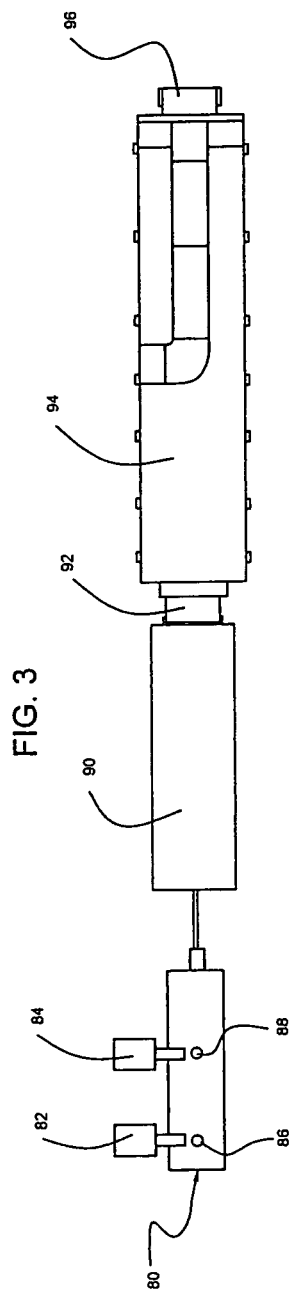
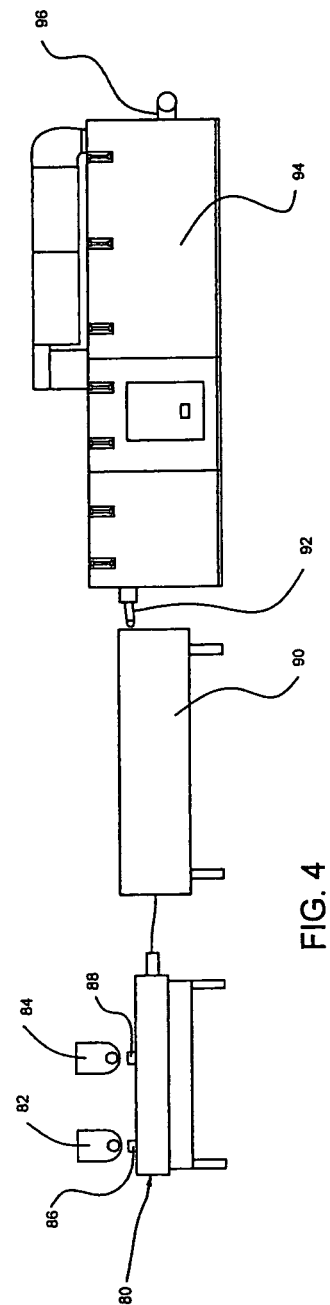

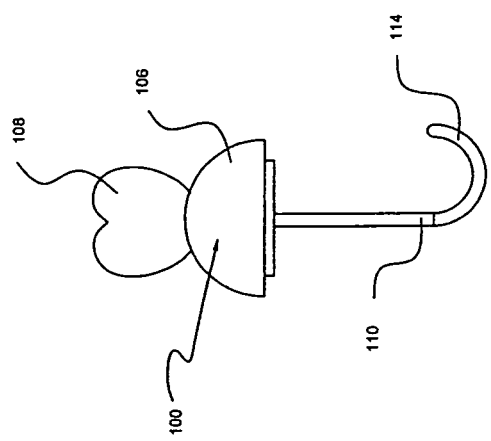

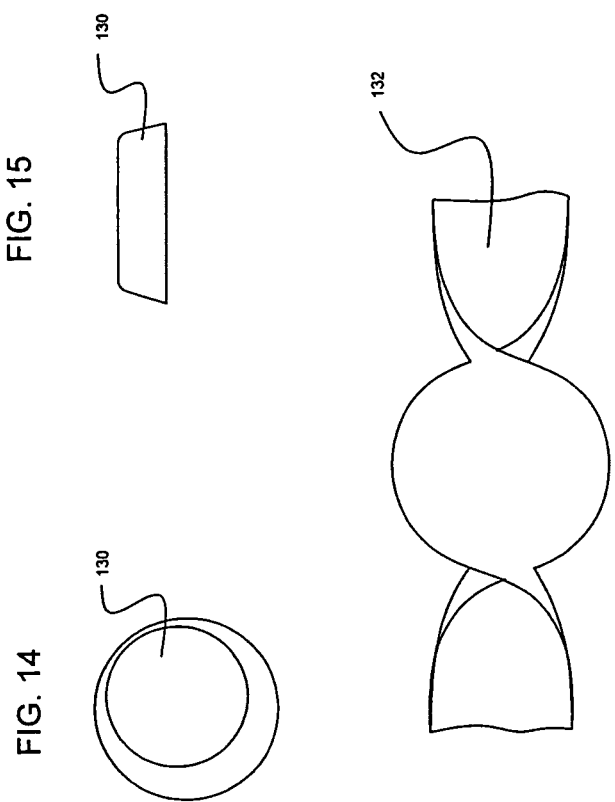

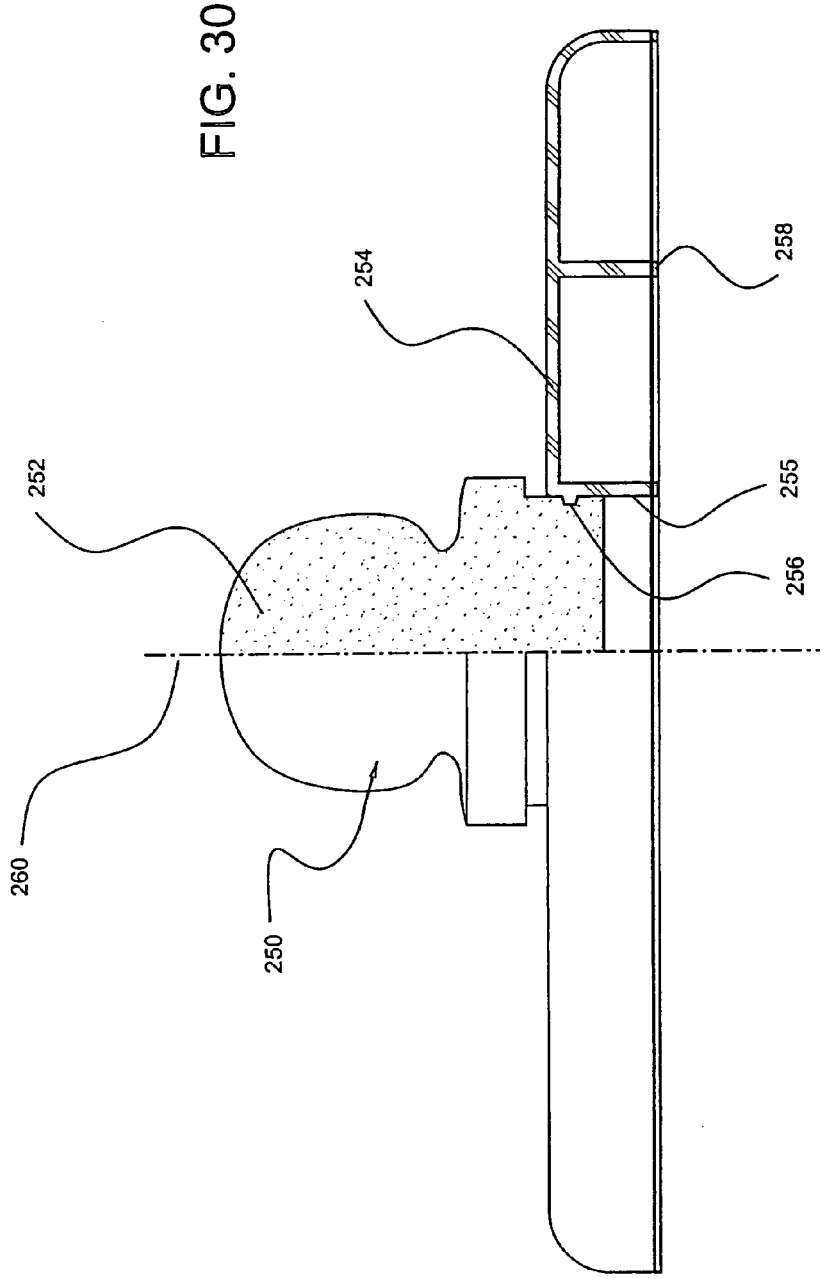

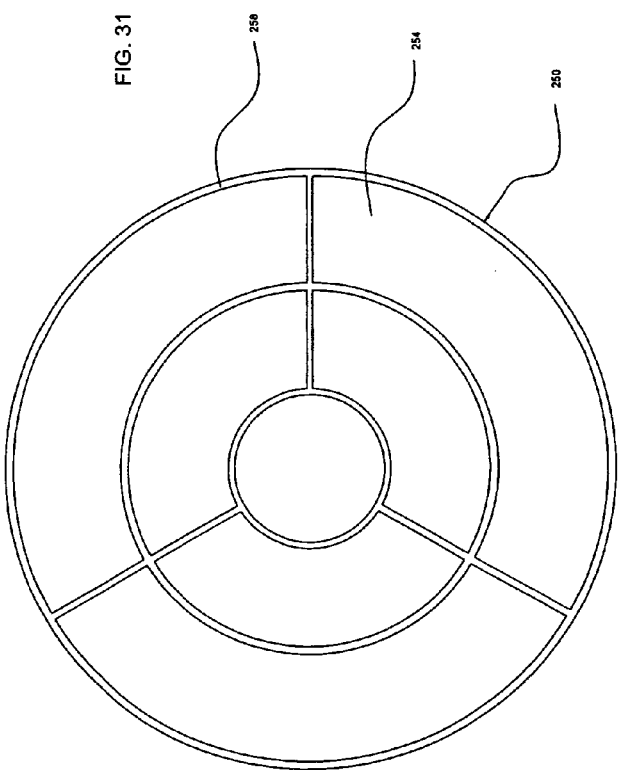

CAT TREAT

This application is a national phase of PCT/US2005/014610, filed on Apr. 28, 2005 and claims priority under 35 U.S.C. §119 and/or §365 to U.S. Application No. 60/566,181, filed Apr. 29, 2004 and U.S. Application No. 60/599,058, filed Jun. 8, 2004, the entire contents of which are hereby incorporated by reference.

BACKGROUND OF THE INVENTION

This invention relates generally to pet comestibles. In particular, the invention concerns a treat for cats.

Previously, it has been known to prepare edible products for pets, including cats. For example, U.S. Pat. No. 6,506,401 issued to Rothamel et al. on Jan. 14, 2003, discloses an edible product which includes a flour-based shell in which the principal ingredients are soy flour and wheat flour. The shell may include sugar in the range of 0-6 wt % and crystalline fructose in the range of 0-6.5 wt %. The product includes other ingredients so that it can be used as a hairball treatment. See also U.S. Pat. Nos. 6,228,402, 6,159,508, and 5,989,604 issued to Wolf et al.

It is also known to prepare pet treats by an infusion process where phytochemicals are added to pet foods such as ground liver, ground chicken and others that have been formed as cubes. The pet treats can be infused with medicinals resulting in treats that are more effective than pills. Infusion using osmotic dehydration is disclosed where the food product is submerged in a solution having a high concentration of solutes such as a solution with a high sugar component (e.g., high fructose corn syrup, dextrose, saccharides, aldohexoses, and hydroliyzed starches). Water in the food product then migrates to the solution. See, for example, U.S. Pat. No. 6,440,449, issued the Hirschberg on Aug. 27, 2002.

The known pet treats are typically offered as an object that the pet either consumes, or does not consume—at the whim of the pet.

BRIEF SUMMARY OF THE INVENTION

With typical edible treats for companion animals are offered as rewards for good behavior, training enticements, and special occasions. As such, the edible treats are generally offered to the companion animal without interaction from the owner, i.e., the companion animal simply eats the treat and moves on to other activities. The treat of this disclosure extends the interaction time between the owner and the companion animal, such as a cat.

This invention involves the preparation of a pet treat having a sugar-based portion or component, and a support portion or component, where the support portion is adapted for use by the pet owner so that interaction between the pet and its owner is fostered. Preferably the sugar-based portion includes a flavorant tailored to the pet for which the treat is intended and known to be a preference for the pet. The combination of the sugar-based portion and the flavorant entices the pet to lick the sugar-based portion while the support portion is held by the pet owner, thereby facilitating the pet-human interaction.

Various shapes and configurations for the sugar-based portion of the treats are contemplated. For example, simple disk shapes; geometric shapes including polygons; naturally occurring shapes like seashells, fish, and hearts; drops; prisms; knobs; tapers, and the like are suitable for these treats.

To prolong the pet's interest in the treat, the treat may be shaped like a favorite toy, and fashioned from a composition with flavors and tastes that hold the pet's interest. Alternatively, the treat may be configured as a new toy, and may include moveable features. The treats can also be implemented in pet toys. To this end, the treat can be resiliently mounted so that it can oscillate. The treat can be mounted so that it can rotate. These are but a few of the myriad configurational possibilities.

The treat may be fashioned to elicit a strong organoleptic response from the pet. For example, where the pet is a cat, a sugar base may be mixed with dried meat, dried fish, or the like to arouse and maintain the pet's interest. Structurally, the treats of this invention include the edible portion for the pet, and a supporting portion on which the edible portion is mounted. The supporting portion is preferably arranged so that it can be manually held or mounted to a surface.

Either a batch process or a continuous process may be used to make the treats of this invention.

BRIEF DESCRIPTION OF THE DRAWINGS

Many objects and advantages of the present invention will be apparent to those skilled in the art when this specification is read in conjunction with the drawings wherein like reference numerals are applied to like elements and wherein:

FIG. 3 schematically shows a top view of a continuous production process;

FIG. 4 schematically shows a front view of the continuous production process of FIG. 3;

FIG. 6 shows a second embodiment of a lollipop shaped treat;

FIG. 14 is a perspective view of a lozenge-shaped treat;

FIG. 15 is a side view of the lozenge-shaped treat of FIG. 14;

FIG. 16 is a top view of a wrapped lozenge-shaped treat of FIG. 14;

FIG. 30 is a view in partial cross section of a treat with an adhesively mountable base;

FIG. 31 is a view of the bottom of FIG. 30;

DETAILED DESCRIPTION OF THE INVENTION

Figure 1:
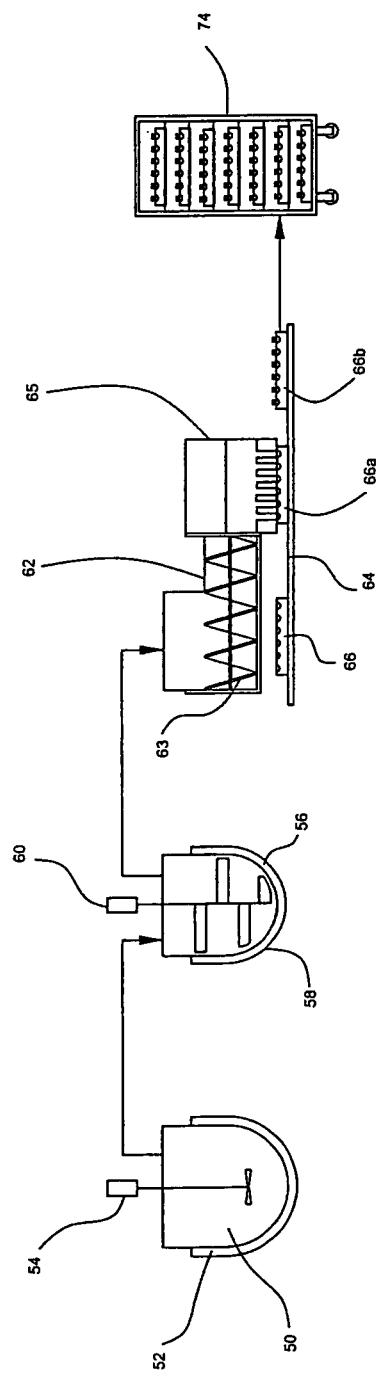
FIG. 1 schematically shows apparatus for a batch process to produce cat treats.

This treat has a variety of desirable characteristics as compared with prior treats. Structurally, the treat according to this disclosure includes an edible portion and a support portion. Unlike prior treats, an important characteristic of the treat according to this disclosure provides an interactive treat that promotes a mode of interaction between the human and the companion animal. Such interaction is effected by providing the support portion which can be held by the pet owner so that the pet does not merely consume the edible portion or move to a different place to consume the edible portion. For example, where the companion animal is a cat, the treat promotes a human-feline bonding, as the cat may be sitting on the owner's lap while enjoying the product as it is held by the owner.

Another desired feature of the treat of this disclosure is to lengthen the time the companion animal spends enjoying the treat. To this end, the treat may have a hard texture that can be consumed by licking rather than chewing. With this feature, the companion animal needs a longer time to eat the treat completely licking takes longer that chewing to completely the treat. Simultaneously, the treat provides another benefit for the pet owner. Namely, if the companion animal tires of the treat and any related attention from the owner, the owner can dispose of the unused portion of the treat or save it for reuse on another occasion. Plainly, the consumption time frame and pet attention time frame will vary from pet species to pet species. Nevertheless, a desirable time frame for consumption is on the order of 5 minutes for a cat.

Another intended feature for a treat according to this disclosure is to elicit an intense reaction from the pet. To this end, the treat ought to be highly palatable and desirable for the pet. For example, where the intended pet is a cat, the treat may have the flavor of fish, poultry, or other flavors as to which cats have been found to be attracted.

The structural embodiment of the treat can be selected from a variety of shapes and configurations. The configuration may be selected to promote or enhance the playful indulgence for the pet. To this end, the treat may mimic a familiar toy, or a new toy with mechanical characteristics such as resiliency or movement.

To promote the organoleptic response of the pet, the edible portion of a suitable treat may have a composition with a sucrose or fructose base (i.e., a sugar base), and may include a flavor compound such as dried meat, dried fish, dry digest, or other compound tailored to the target companion animal. Materials such as dried meat, dried fish, and dried digest are particularly favored by cats and are thus highly palatable. In addition to the sugar base, the treat includes starch so that its formulation gives a hard-candy texture and composition. Other suitable ingredients could include sucrose, dextrose, corn syrup, starch gums, coloring agents, and preservatives, if necessary.

Dry palatants may be incorporated into the treats to drive indulgence and elicit a strong organoleptic response from the companion animal. The dry palatants can be meat, fish, or dry digest. During preparation of the treats, the palatant ingredients may be pre-cooked for quicker production, or be processed with the sugar in such a way that the palatant ingredients are cooked during preparation of the treats.

The component formulation for a cat treat according to this disclosure may include the following ingredients:

| Ingredient | Amount, wt. % |
| --- | --- |
| Dextrose (heated) | 40-60 |
| Corn syrup | 0-10 |
| Dextrose (solid) | 0-5 |
| Dried digest | 30-50 |
| Artificial color | 0-5 |
| Liver flavor | 0-3 |
| Salt | 0-2 |
| Onion extract | 0-2 |
| Garlic powder | 0-2 |

From the foregoing ingredient list, it will be seen that sugar (i.e., the listed dextrose) is the base or principal ingredient for the edible portion of the treat. The next most prevalent ingredient is the dry digest, which may comprise a starch to create a hard, candy-like texture for the edible portion of the treat. It is also contemplated that the edible portion may have a jelly-like or taffy-like texture either or which may be softer than a hard, candy-like texture.

To make treats according to this invention, either batch processing and continuous processing are suitable manufacturing techniques. The continuous process is presently the preferred process as it is better suited to automation than a batch process.

Where a batch process is used (see FIG. 1), the sugar base is first melted and liquefied to a temperature of >200° F. To accomplish that melting step, the sugar may be added to a suitable conventional kettle having a steam jacket 52 and an internal mixing device 54. The kettle 52 may have a capacity on the order of 30 gallons. As the sugar base is heated, that portion in contact with the kettle wall liquefies as a result of the heat transferred from the steam jacket 52. The mixing device 54 is operated during the melting process to stir the sugar base and promote uniform temperature and melting.

When the sugar base is melted, a portion is transferred to a smaller suitable conventional kettle 56, also having a steam jacket 58 and a mixer 60. This smaller kettle may have a capacity on the order of 5 gallons. In the smaller kettle 56, the remaining dry ingredients (one or more pre-cooked palatants) are added to the liquefied sugar base and stirred by the mixer 60 to attain a substantially uniform blend. The steam jacket 58 maintains the temperature of the sugar base and heats the remaining ingredients so that the blend is flowable. While both the larger kettle 50 and the smaller kettle 56 have been described as having steam jackets, other conventional heating sources such as resistance heating, radiant heating, conductive heating, and inductive heating are also within the scope of this invention.

Next, the blend is poured into a suitable conventional mold filling device 62, positioned above a conveyor 64. The filling device 62 may have an internal auger 63 to move the blend to a filing head 65. The conveyor 64 operates to move preformed molds 66 beneath the filling head 65. Each mold 66 may have a plurality of mold cavities constructed and arranged to mate and cooperate with the filling head 65. It is also contemplated that multi-part molds may be used if desired to have more complex shapes. If necessary or desired, mold cavities may be coated with suitable conventional release agents before being advanced to the mold head 65. Thus, when the conveyor 64 advances the mold 66a into position in registry with the filling head 65, the mold cavities of the mold 66a are filled.

The conveyor 64 then advances the mold 66b to a subsequent position where an attachment portion is inserted into the blend in each mold cavity. The attachment portion may be shaped like a stick and is added to the soft dough or blend to enhance handling ease. Moreover, the optional stick can be either edible or non-edible.

Figure 2:
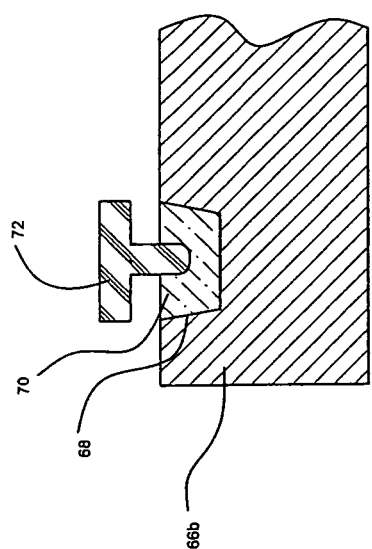
FIG. 2 is an enlarged detail view of a mold used with the process.

Each mold cavity 68 (see FIG. 2) receives a predetermined quantity of the blend 70, for example 3 to 5 grams. The mold cavities 68 of each mold 66 may be similarly shaped. Alternately, each mold 66 may have a variety of differently shaped mold cavities 68. Typically the sidewalls of the mold are tapered to facilitate release of the finished product from the mold. Nevertheless, the mold cavity 68 may be shaped on one or both sides as desired. The attachment 72 typically protrudes above the mole 66b and above the associated mold cavity 68.

The soft blended dough with its attachment portion is allowed to cool and harden in the mold 66. That cooling process (see FIG. 1) may take place under ambient conditions by placing the filled molds 66 is a suitable conventional storage rack 74 so that air can circulate around it. Alternately, the filled molds can be placed in a refrigerated space to expedite the cooling process.

When the treats have cooled and solidified, they are removed from the corresponding mold cavities, packaged, and distributed for sale.

For a continuous process (see FIG. 3), a suitable conventional twin screw extruder 80 with external heating may be used. A pair of feed hoppers 82, 84 is spaced along the extruder 80 barrel in alignment with corresponding feed openings 86, 88 for the extruder 80. The sugar base is added to the first hopper 82 and advances to the corresponding feed opening 86 at the upstream end of the extruder 80. As the sugar base advances through the extruder 80, it is heated and liquefied both by the shearing action of the extruder screws and by any additional external heating that may be used. Typically, the temperature of the sugar base exceeds 180° F. The remaining ingredients, including any precooked palatants, are supplied to the second hopper 84 and advance to the second feed opening 88 in the extruder 80 so that the remaining ingredients are mixed with and blended with the liquefied sugar base before reaching the downstream end of the extruder 80. At the downstream end of the extruder 80, the blend of sugar base and other ingredients is discharged through a small hole of a die plate in the form of a rope or extrudate.

The extruder 80 delivers extrudate to a suitable conventional continuous forming and wrapping machine 90. The machine 90 portions the extrudate into appropriately sized amounts, shapes those sized amounts into a desired configuration in rotating mold cavities, applies a support portion, and wraps the assembled treat with a suitable over wrap.

Wrapped pieces advance from the forming machine 90 to an intake end 92 of a conveyor that moves through a suitable conventional refrigeration tunnel 94. In the refrigeration tunnel 94, the individual treats cool so that the blend solidifies and hardens. Finished treats are then collected from the discharge end 96 of the conveyor of the refrigeration tunnel 94 and move to a packaging station or operation.

Figure 5:
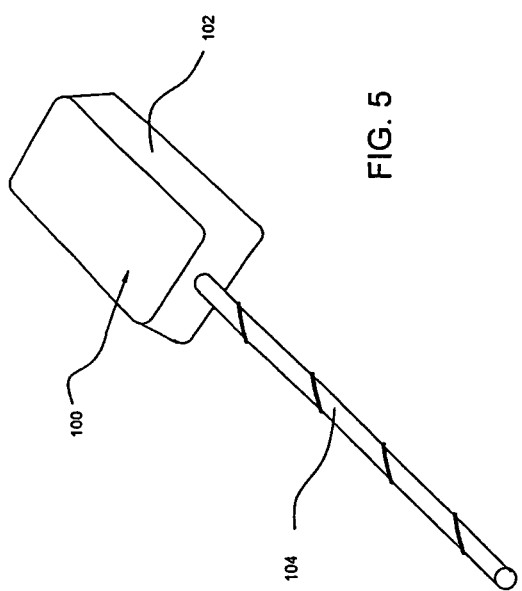
FIG. 5 shows a first embodiment of a lollipop shaped treat.

The product resulting from either the batch or continuous production process may resemble a lollipop 100. (See FIG. 5). For the lollipop configuration, the continuous forming and packaging machine 90 cuts the extrudate rope into small pieces, forms the lollipop, adds the stick, and wraps the lollipop.

The product can be presented as individually wrapped sticks, if lollipops. Wrapping for the product can be cellophane and may be collated in a perforated strip for unitary dispensing. Product may also be wrapped as a single product with multiple product pieces being placed in a container that acts as a dispenser. The molded shape of the treat may have any desired shape including, by way of example, a circle, a sphere, a fish, a heart, a paw, or the like, any such shape may also include an embossed design. Any of those shapes may be offered as lollipop style or a conventionally styled treat.

More particularly, the lollipop 100 (see FIG. 5) may include an edible portion shaped as a rectangular prism with tapered sides and a supporting stick 104. The stick may be smooth, or decorated, as for example with a spiral bead or decoration.

More complex shapes for a lollipop are also contemplated. The edible portion of a lollipop 100 (see FIG. 6) may include substantially hemispherical base 106 supporting a geometric shape 108 such as a portion of a heart. The edible portion may be mounted to a support 110 having a disc underlying the base 106 to give lateral support. Further, the support 110 may include a hooked end 114 so that the treat can be easily pulled to play with the cat while the treat is being consumed.

Figure 9:
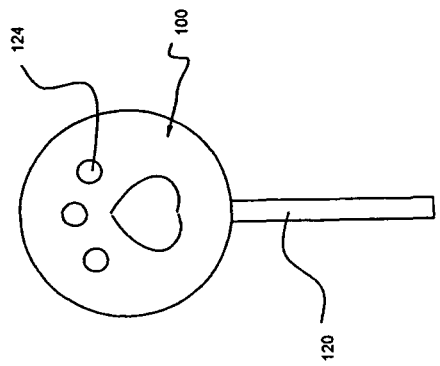
FIG. 9 shows a paw-print embossed lollipop shaped treat.
Figure 7:
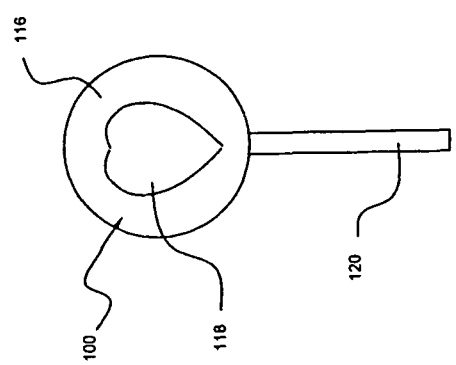
FIG. 7 shows a heart-embossed lollipop shaped treat.

The lollipop may also have a disk-shaped edible portion 116 (see FIG. 7) carried by a rod 120. If desired, the edible portion may include an embossed or raised design feature, such as a heart 118, or a paw print 124 (see FIG. 9).

Figure 8:
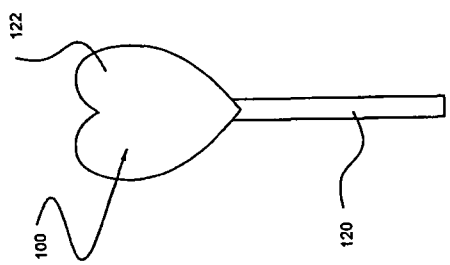
FIG. 8 shows a heart-shaped lollipop shaped treat.
Figure 13:
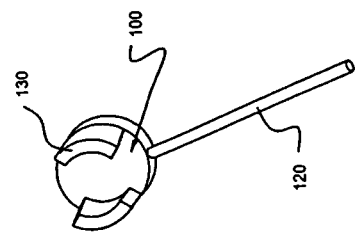
FIG. 13 shows a geometrically shaped treat.
Figure 11:
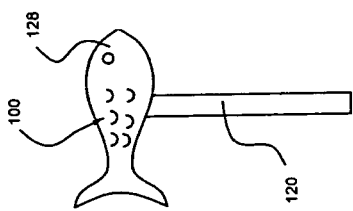
FIG. 11 shows a fish-shaped treat.
Figure 10:
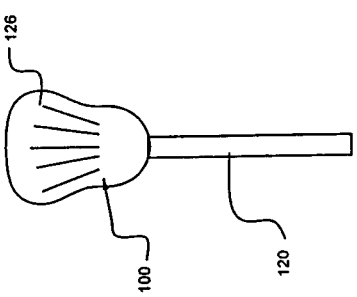
FIG. 10 shows a seashell-shaped treat.
Figure 17:
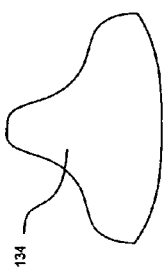
FIG. 17 is a perspective view of a drop-shaped treat.

In addition to geometric shapes such as disks and prisms, the edible portion may have various other shapes. More particularly, the edible portion may have a heart shape 122 (see FIG. 8), a sea shell shape 126 (see FIG. 10), an animal shape such as a fish 128 (see FIG. 11), or a complex geometrical configuration 130 (see FIG. 13).

Figure 12:
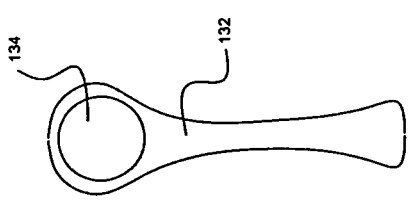
FIG. 12 shows a circular treat on a spoon.

The support portion may also have other utilitarian shapes. For example, the support 132 (see FIG. 12) may be configured like an eating utensil such as a spoon, with the edible portion 134 carried on the utensil, rather than at the end of the support.

The edible portion of treats according to this disclosure may also be shaped as individual candies. The candies may be used as individual treats, but may also be designed as renewable portions for use with a reusable support portion. A disk-shaped candy piece 130 (see FIG. 14) may be generally circular and include straight tapered sides (see FIG. 15). Each candy piece 130 may be individually wrapped 132 (see FIG. 16), or a plurality of candy pieces may be packaged in a suitable container, which may be resealable. The candy pieces may have surface embellishments such as described above in connection with various lollipop designs. Moreover, the candy pieces may have more complex shapes such as a teardrop 134 having a flat bottom. The possibilities for shaping the edible candy pieces are myriad.

Figure 18:
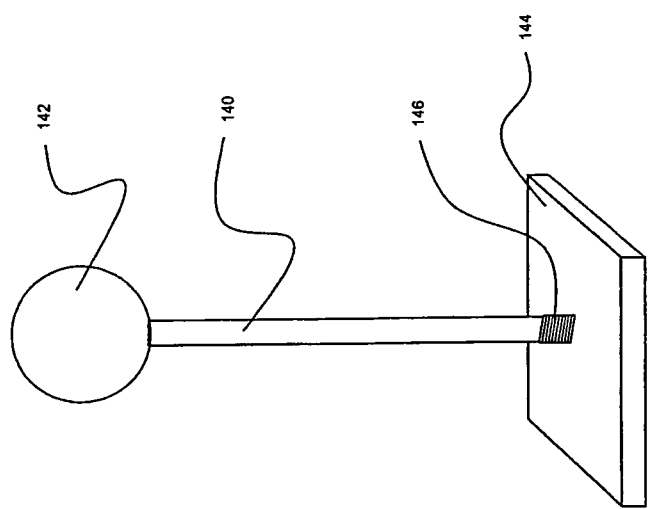
FIG. 18 is a perspective view of a spring-mounted treat.
Figure 19:
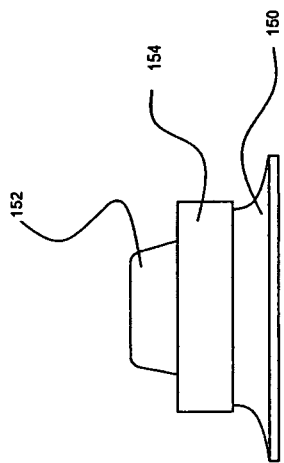
FIG. 19 is a view, in partial cross-section, of a treat having a push-down enclosure.

The treat may be designed as a part of a toy for the pet. For example, the lollipop 140 (see FIG. 18) may have a generally spherical edible portion 142 with the support portion including a base 144 to which the lollipop 140 is attached by a resilient, spring or spring-like connection 146. As the cat licks the lollipop 140, the spring 146 allows the treat to move so that it is more challenging for the cat to lick. In addition, the cat may decide to bat the lollipop with its paw and enjoy the resulting movement. The base 144 may also include an adhesive coating so that the top can be mounted on horizontal or vertical, or inclined surfaces to make its action more interesting to the cat.

Figure 20:
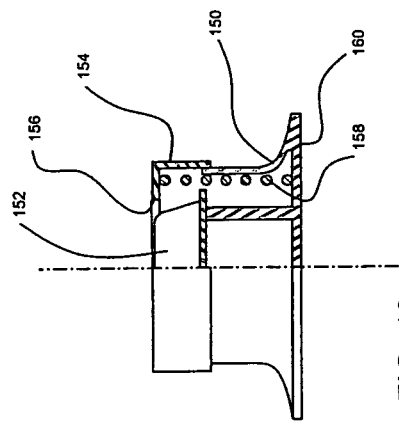
FIG. 20 is a side view of the treat of FIG. 19 showing the enclosure in its second position.

The treat may also be designed so that the cat must learn a simple manipulation to enjoy the treat. For example, the support portion 150 may substantially enclose the edible portion 152 and include a collar 154 biased to surround the edible portion 152 by a spring 158. Preferably, the collar 154 has a central opening 156 slightly larger than the maximum diameter of the edible portion 152. To fully enjoy the treat, the cat must learn to press down on the collar 154 so that the edible portion 152 is fully exposed (see FIG. 20). If desired, a surface adhesive may be provided on the bottom 160 of the support 150 so that the toy can be mounted with virtually any orientation.

Figure 23:
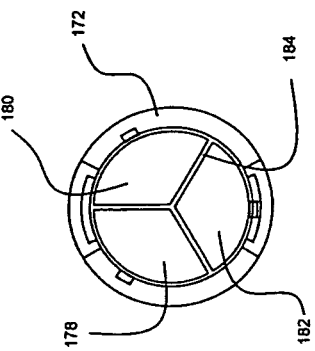
FIG. 23 is a top view of the push-up dispenser of FIG. 22.
Figure 22:
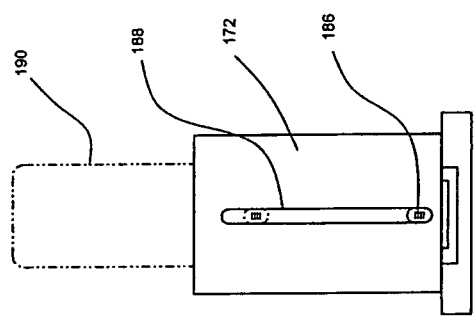
FIG. 22 is a side view of the push-up dispenser of FIG. 21 with the cover removed.
Figure 21:
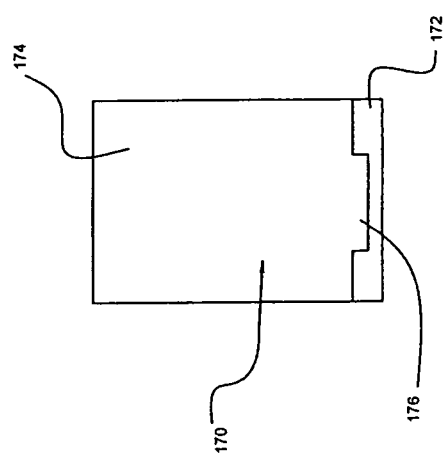
FIG. 21 is a side view of a push-up dispenser for treats.

A treat may also be arranged with two or more different edible portions, where each edible portion has the same or different flavorants. Such a treat 170 (see FIG. 21) may include a support portion 172 having a removable, replaceable cover 174 which is held in place on the support portion 172 by one or more detent arrangements 176. The detent arrangement 176 may include a radially projecting flange on the support portion 172 that cooperates with and is received by a facing groove inside the cover 174. The support portion 172 may be generally cylindrical (see FIGS. 22, 23) and define two or more chambers that in cross section are shaped like segments of a circle (see FIG. 23). The chambers may be similarly sized or may have different sizes. Similarly sized chambers would be useful if the same edible material flavor is used in each chamber and the treat is designed for multiple uses, or it is anticipated that the pet would not consume the entire treat at one time. Differently sized chambers would be useful if, for example, one is filled with an edible component that would last for three minutes, another is filled with an edible component that would last for six minutes, and another is filled with an edible component that would last for nine minutes. The user could then select the chamber most closely approximating the time available to interact with the pet.

To use the treat, each chamber includes a movable base with a tab 186 guided along the support portion 172 by a corresponding slot 188. Thus, by moving the tab 186 along the slot 188, the edible portion of the treat moves from an enclosed position to an exposed position 190, or from an exposed position to a more fully exposed position. Moving the tab down the slot 188, the edible portion can be returned to an enclosed position.

Figure 24:
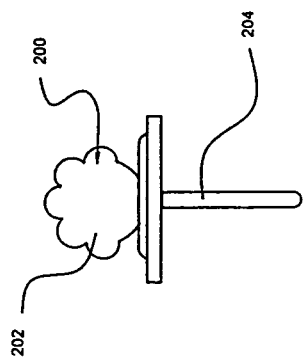
FIG. 24 is a front view of a wearable ring treat embodiment.
Figure 25:
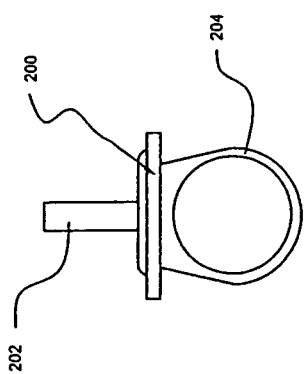
FIG. 25 is a side view of the wearable ring treat embodiment of FIG. 24.

The treat may also be constructed to be wearable. For example, it can be arranged in the shape of ring to be worn on the pet owner's finger. (See FIGS. 24, 25). The treat 200 may include a ring shaped support portion 204 and an edible portion 202. The edible portion 202 may be shaped like a flower or may any of the other embodiments described herein.

Figure 26:
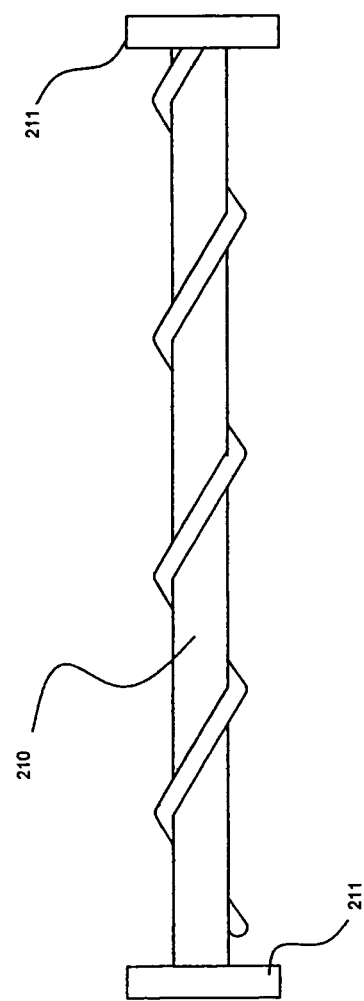
FIG. 26 depicts an edible stick-shaped treat adapted to roll.
Figure 28:
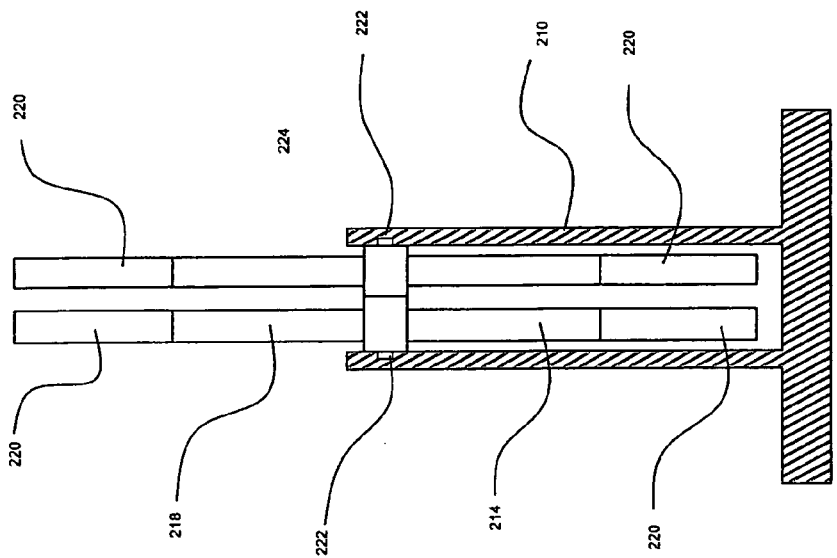
FIG. 28 is a view in partial cross section taken along the line 24-24 of FIG. 27 with both arms aligned.

In some applications, it may be desired to shape the treat as a rod 210 with surface ornamentation (see FIG. 26). As depicted, the surface ornamentation may include a first rod with a second rod spirally wrapped around the first rod. Either one or both ends of the rod 210 may be attached to corresponding disk-shaped members 211 so that the treat can rotate around the axis of the rod 210 and be rolled by the pet as the rod 210 is licked. The rod may also comprise two or more elongated pieces that are twisted or braided together.

Figure 39:
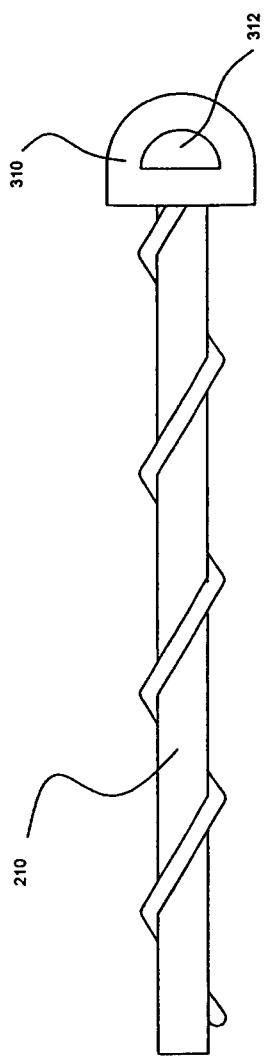
FIG. 39 is a side view of a stick treat with an end loop.

Other types of support members are also within the contemplation of this invention. For example, a D-shaped support 310 (see FIG. 39) may be attached to one end of the rod 210. Where the D-shaped support 310 includes an eyelet opening 312 the treat can be suspended by a lanyard or string so that the treat can dangle or be worn around the pet owner's neck. While the opening 312 is shown as having a D shape, other shapes are also within the scope of this embodiment including, without limitation, circles, polygons, and other shapes.

Figure 40:
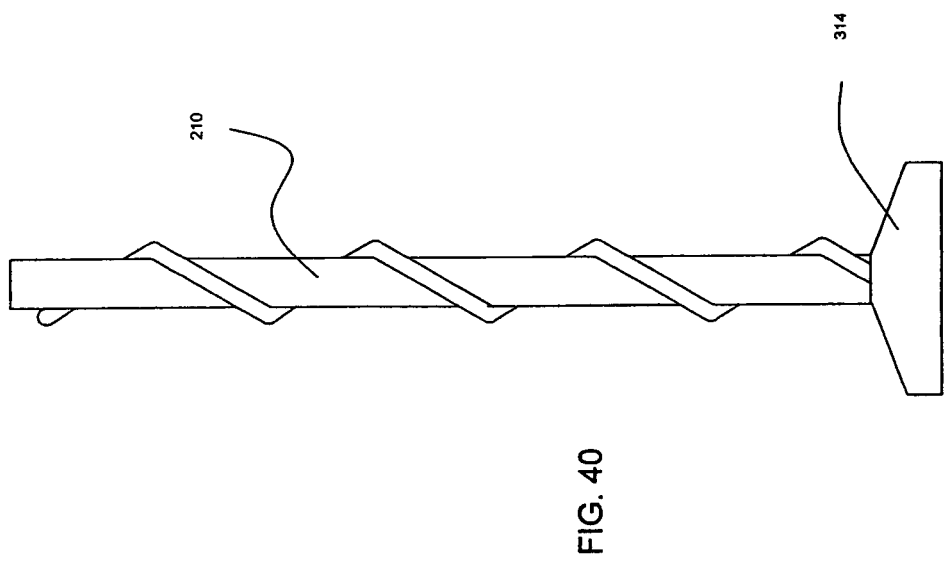
FIG. 40 is a side view of a stick treat with a mounting base.

If desired, one end of the rod 210 (see FIG. 40) may be attached to a base element 314 to support the treat with its axis being substantially vertical. The base 314 may be fabricated from suitable conventional plastic material. As desired, the treat may be permanently fixed to the base 314 or it may be slidably attached so that the base 314 can be reused when the treat has been consumed. Furthermore, it may be desirable to have a plurality of interchangeable supports that can used with the treats to add variety and interest for the pet. For example, the rod-like treat 210 may be designed to work interchangeably with the supports of FIGS. 18, 26, 39, and 40. Similarly, the lollipop treats of FIGS. 5 and 7-13 may be designed to work interchangeably with the supports of FIGS. 18, 39, and 40. Such systems of treats with interchangeable supports complement the bonding between pet and owner.

Figure 27:
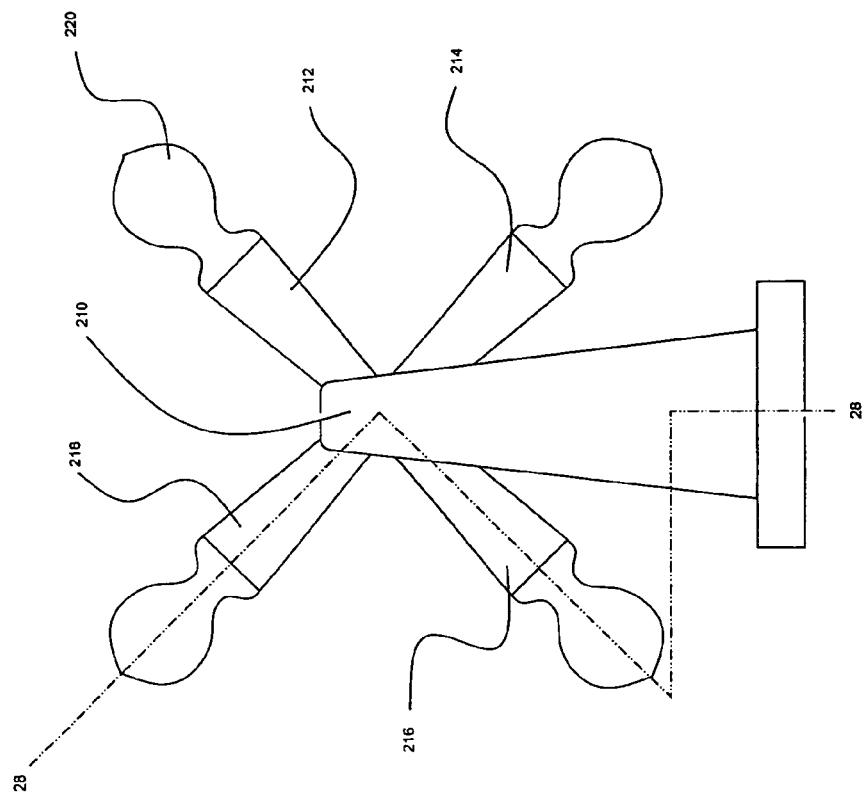
FIG. 27 is a side view of a plurality of treats on a rotatable toy mount.

The treat may also be constructed to have multiple rotatable edible portions. For example (see FIG. 27), a support portion 210 may include a plurality of rotatable arms 212, 214, 216, 218 each of which carries an edible portion 220 at its end. The rotatable arms are attached to the support member 210 by a pair of axially aligned pins 222 that are received in conforming recesses of the support member 210. The length of the pins 22 and the diameter of the pins 22 relative to the conforming recesses allow the freedom of rotation to be predetermined. Moreover, with a similar pin and conforming recess connection 224 between pairs of arms, the angular spacing of the arms can be adjusted as desired. Such flexibility may be useful for packaging purposes.

Figure 29:
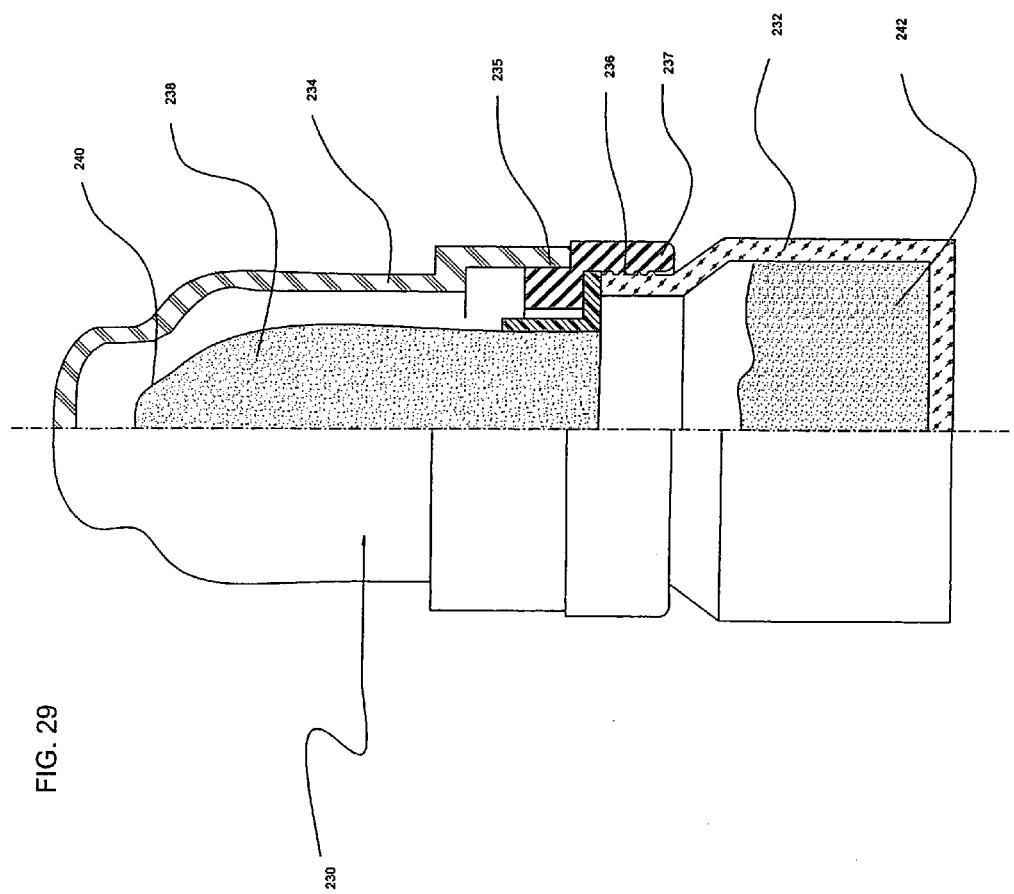
FIG. 29 is a view in partial cross section of a treat with a removable, reclosable end cap and container with refreshable powder.

Yet another embodiment of the treat 230 (see FIG. 29) of this disclosure includes a support portion 232 in the shape of a jar. A removable, replaceable cover 234 can be attached to the support portion 232 with a sleeve-like connection 235. The edible portion 238 of the treat is carried by the jar and is fixed to the jar by a cap 237 having an internal thread 236 mating with the jar. In use, with the cap 234 removed, the pet can enjoy the edible portion 238 of the treat. But, the edible portion 238 can be rejuvenated with palatant material as frequently as the owner may desire. To this end, the cap 237 is removed, and the surface 240 of the edible portion 238 is dipped into powdered palatant 242 contained in the jar 232. Then, the treat is reassembled in the configuration shown. Thus, the pet's interest in the treat can be prolonged by refreshing the edible portion with palatant.

The treat can also be constructed with replaceable edible portions. For example, the treat 250 (see FIG. 30) includes a generally circular support portion 254 having a central opening 255. The central opening 255 may include a radially inwardly projecting flange 256 that engages a cylindrical part of the edible portion 252. The cylindrical part is sized to be received in the central opening 255 so that its surface is engaged and retained by the flange 256. In use, the edible portion 252 may thus snap into position relative to the support 254. If desired, the central opening 255 may include a generally helical thread projecting inwardly. Where the edible portion 252 is sufficiently soft, it can simply be threaded into the opening. If the edible portion 252 is not sufficiently soft, it may be provided with a complementary thread so that it can be attached to the support 254 with a threaded connection. The edible portion 252 preferably is substantially circularly symmetric about an axis 260 that coincides with the axis of the support portion 254. As shown, the edible portion 252 has a generally spherical knob. To replace the edible portion 252, the old edible portion 252 is pulled from the support portion 254, and a fresh edible portion inserted so that its circular end engages and is retained by the flange 256.

To hold the support portion in position, the bottom may be provided with an adhesive layer 258. So that the support portion 254 can be light, and can be removed without inordinate difficulty, the bottom is fashioned with concentric rings and radial ribs. With the adhesive layer 258 being applied to these smaller surface areas, the treat 250 can be removed if desired.

Still another embodiment of the treat 270 (see FIGS. 32, 33) includes a circular base portion 274 that carries an edible portion 272. The edible portion 272 has a generally frusto-conical shape with a substantially hemispherical end. A transparent cover 273 surrounds and encloses the edible portion 272, and is attached to the base portion 274 with a sliding connection 275. An adhesive layer 276 applied to the bottom of the base portion 274 to attach the treat 270 to a surface. The base portion 274 is constructed with concentric rings and radially extending ribs. The outer ring has a larger radial width than the inner ring to provide appropriate adhesion.

Figure 35:
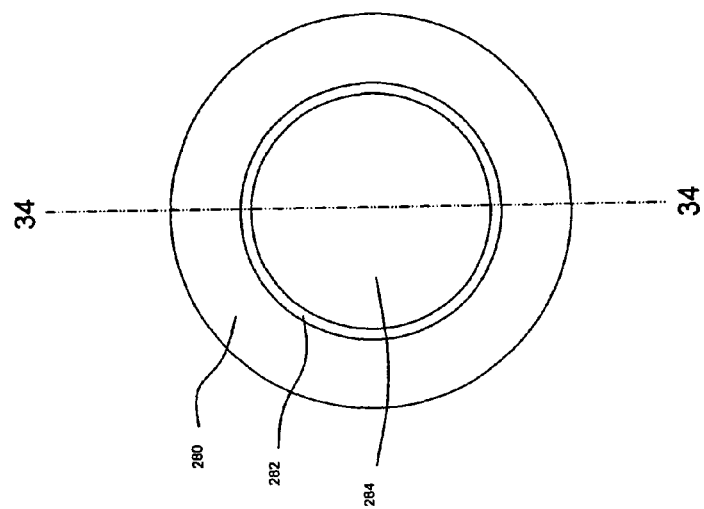
FIG. 35 is a side view of a ball-like treat.
Figure 34:
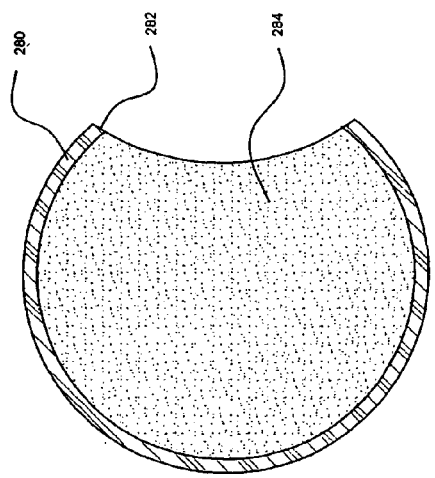
FIG. 34 is a view in cross-section taken along the line 34-34 of FIG. 35.

Another contemplated embodiment of the pet treat (see FIG. 35) comprises a generally spherical support or shell 280 which may be fabricated from plastic or any other suitable conventional material. The support 280 (see FIG. 34) is preferably a thin shell that includes an opening 282 exposing the interior of the support 280. The edible portion 284 of the treat is contained in the support 280 and accessed by the pet through the opening 282. While the opening is shown as being generally circular (see FIG. 35), it may have any desired shape including without limitation polygonal and/or irregular peripheries. With this embodiment, the treat can be held or allowed to roll on the floor or another horizontal surface. When placed so that it can roll, the treat functions as a toy for the pet, too.

Figure 36:
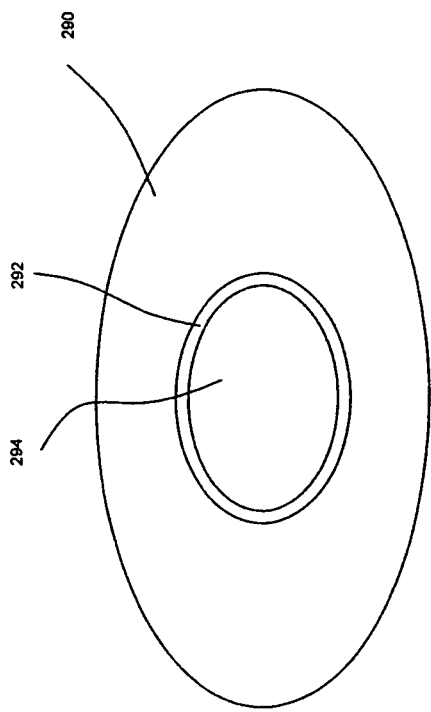
FIG. 36 is a side view of an ellipsoidally shaped treat.

Other shapes for the shell are also contemplated. For example, a football-like shape (see FIG. 36) may be used. Here, the support 290 is shown as an ellipsoid of revolution about its major axis and includes an elliptical opening 292 exposing the edibile portion 294 of the treat. When this embodiment is placed on the floor, as the pet licks it, the treat will roll erratically. The ellipsoid shown in FIG. 36 is not intended to be limiting. For example, the outer support 290 may have more pointed ends to resemble and American football, and it may be ellipsoidal in cross section when viewed in perpendicular cross-sections. Further, the support 290 may be characterized as a prolate spheroid or an oblate spheroid. An oblate spheroid would, for example, tend to wobble rather than roll when played with by the pet.

Figure 38:
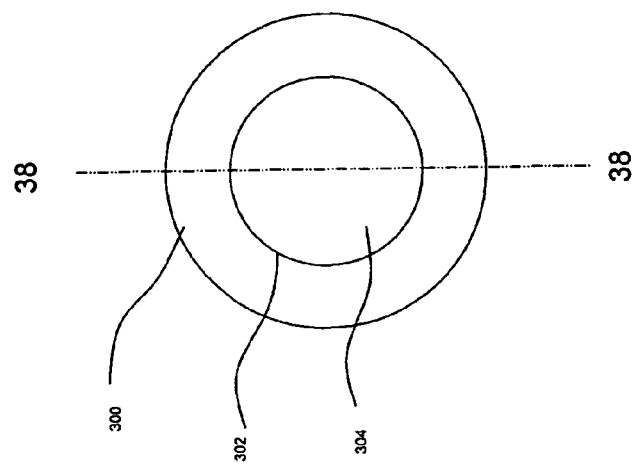
FIG. 38 is a side view of the cylindrical treat.
Figure 37:
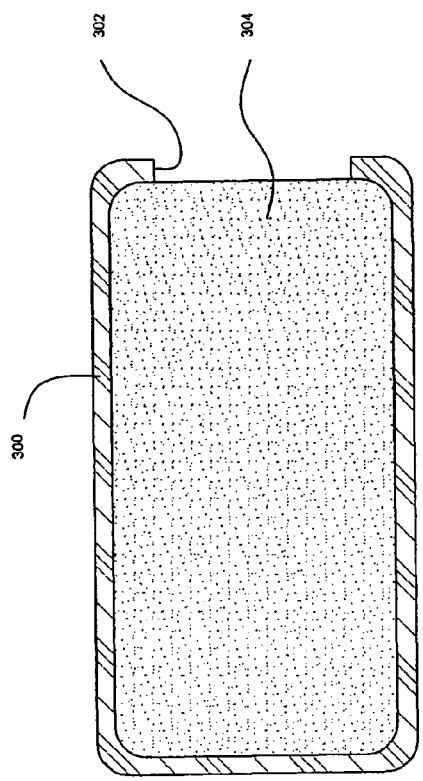
FIG. 37 is a view in cross-section taken along the line 37-37 of FIG. 38.

Of course, the support need not be spherical or elliptical. More particularly, the support 300 (see FIG. 37) may be a thin generally cylindrical shell with a closed end and an opening 302. The edible treat portion 307 is contained by the support 300. The opening 302 (see FIG. 38) may not fully expose the end of the cylindrical support or shell 300. However, it is also contemplated that the entire end of the edible portion 304 may be exposed if desired. As with the embodiment of FIGS. 34 and 35, the embodiments of FIGS. 36-38 may have openings of any desired shape. Furthermore, the shells of the embodiments in FIGS. 36-38 may be fabricated from any suitable conventional material, including without limitation plastic material.

Figure 42:
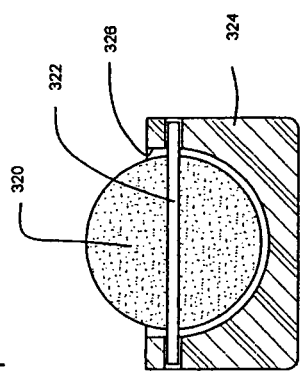
FIG. 42 is a view in partial cross section of a ball-shaped treat rotatable within its support.
Figure 41:
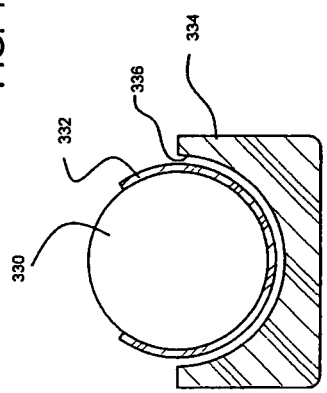
FIG. 41 is a view in partial cross section of a ball-shaped treat rotatable around an axis.

Other movable treat arrangements are shown in FIGS. 41 and 42. The edible portion 320 of a treat may be spherical and carried by an axle 322. The support 324 includes an internal cavity 326 shaped to conform to the outside of the ball 320 while providing clearance so that the ball 320 can rotate about the axle 322. The support 324 also has aligned openings to receive the ends of the axle 322. The base may be fabricated from a suitable conventional material, such as plastic. While the edible portion 320 is shown as being spherical, other shapes are also contemplated. For example, the rotatable edible portion 320 could be disk-shaped, or cylindrical, or irregular. When viewed from the axis of the axle 322, the edible portion 320 may be circular, or polygonal, or irregular, as may be desired. The important feature of the internal cavity 326 is that is permits the rotatable edible portion 320 to rotate while supported by the base 324.

Another treat having rotatable, generally spherical, edible portion 330 (see FIG. 42) includes a thin generally spherical shell 332 with an opening to expose the edible portion 330. The edible portion is preferably freely rotatable within the shell 332. The shell 330, in turn, is received by a conformingly shaped cavity 336 of a support 334. As the pet licks the edible portion 330, the sphere 330 can rotate but is held in one place by the support 334.

The edible part of the treats disclosed and discussed above has a texture that a pet must lick, thereby increasing consumption time.

Where the treat includes a stick, as a lollipop, it can be hand fed to the cat, promoting human-cat interaction. The stick may also be fastened to a spring, adding mobility and feline interest to the treat. The spring can be fastened to a base to make the entire apparatus stationary. Alternatively, a stationary toy can have a movable treat on the end. The cat can play with the treat-on-a-spring, and proceed to eat the treat as desired. The stick can have a suction cup or adhesive attached to its support portion, to simply adhere the entire treat to an arbitrarily oriented stationary surface. The treat can be provided without any stick, and consist of just the edible portion, similar to a hard candy for humans. The hard candy may include a surface that adheres to a stationary surface, permitting the cat to lick the treat while the treat is fastened to the surface. To be more toy-like, the hard candy can be presented in a common push-up dispenser. The treat can be fastened to a ring and worn on a finger to be dispensed to the cat. The treat can even be shaped as an ornamental stick. It can also be formed as a rotatable member for a cat toy. Finally, but without limitation, the treat can be offered as a solid treat in a container having a lift-off top and a container holding renewing palatant powder into which the treat can be dipped to rejuvenate and/or enhance flavor intensity.

Figure 33:
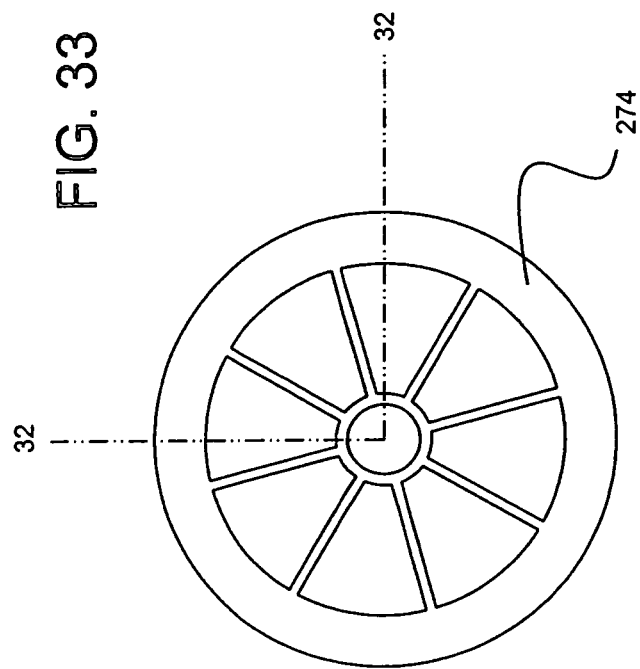
FIG. 33 is a view of the bottom of the treat of FIG. 32.
Figure 32:
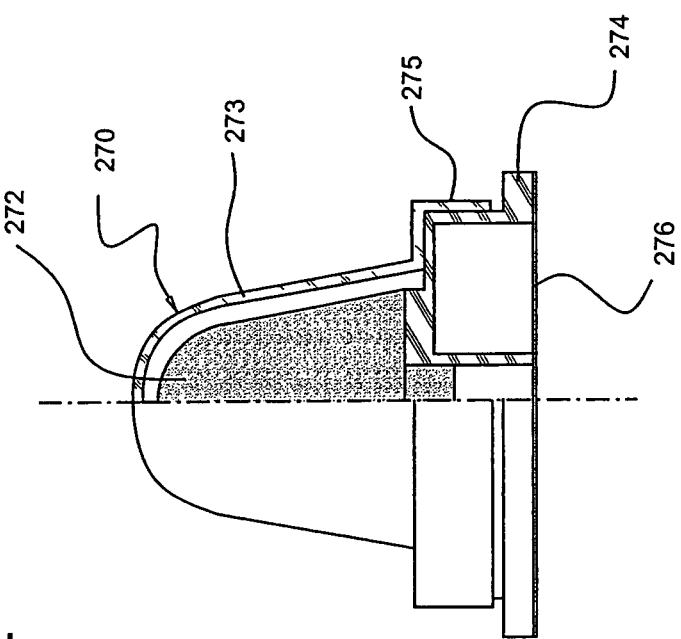
FIG. 32 is a view in partial cross section of a treat with a removable top.

Various embodiments of the pet treat according to this invention are described in the figures. Nevertheless, presently the most preferred embodiment of the invention is depicted in FIGS. 32 and 33. That embodiment is most preferred because it allows flexibility in the human-to-animal interaction. For example, the pet owner can hold the treat for bonding time and/or place it down for the pet to consume independently. This embodiment is also capable of efficient and simple production. For example, this embodiment has process advantages in that the molds have a simple shape and the assembly process only requires a few steps. The embodiments of FIGS. 7-13 and 18 are also preferred as manufacturing equipment is readily available to make lollipop-like items.

Where used in this description, "substantially" is intended to reach embodiments which depart from strict, literal definitions of the grammatical elements being modified. Where used in this description, "polygonal" is intended to reach embodiments that may be defined by substantially straight sides, although rounded or smoothed corners are within the meaning of polygonal.

It will now be apparent to those skilled in the art that a new pet treat, methods for its manufacture, details of suitable embodiments, and a compositional formulation have been disclosed and described. Those skilled in the art will also recognize that may modifications, variations, substitutions, and equivalents exist for features of the invention that do not materially depart from the spirit and scope of the invention. Accordingly, it is expressly intended that all such modifications, variations, substitutions, and equivalents that fall within the spirit and scope of the invention as defined by the appended claims be expressly embraced thereby.

The invention claimed is:

1. A cat treat comprising:
    a comestible portion, having a molded shape that is generally conical, or is a disk, a heart, a fish, a shell, a segment of a cylinder, or a knob, comprising a sugar base including 40 to 60% sugar, 30 to 50% dry digest and a flavorant selected from the group consisting of meat, fish, and poultry, being substantially solid at room temperature, and being substantially circularly symmetric about an axis;
    an inedible support having an upper part to which the comestible portion is attached, having an axis that coincides with the axis of the comestible portion, and having a lower part with an adhesive layer thereon; and
    a removable cover mating with the support and enclosing the comestible portion,
    wherein the comestible portion is ingested by licking.

2. The cat treat of claim 1 wherein the molded shape is selected from the group consisting of a disk, a heart, a fish, a shell, a rectangular prism, a segment of a cylinder, and a knob.

3. The cat treat of claim 1 wherein the support includes a rod.

4. The cat treat of claim 1 wherein the adhesive layer is operable to attach the support to a substantially immovable member.

5. The cat treat of claim 1 wherein the support includes a movable member.

6. The cat treat of claim 5 wherein the movable member exposes the comestible portion of the treat.

7. The cat treat of claim 5 wherein the movable member carries a plurality of comestible portions.

8. The cat treat of claim 1 including a plurality of comestible portions.

9. The cat treat of claim 1 wherein the support includes a ring-shaped portion.

* * * * *